United States Patent
Julian et al.

(10) Patent No.: US 8,634,424 B2
(45) Date of Patent: Jan. 21, 2014

(54) METHODS AND APPARATUS FOR EFFICIENT PROVIDING OF SCHEDULING INFORMATION

(75) Inventors: David Jonathan Julian, San Diego, CA (US); Arak Sutivong, Bangkok (TH)

(73) Assignee: QUALCOMM Incorporated, San Diego, CA (US)

(*) Notice: Subject to any disclaimer, the term of this patent is extended or adjusted under 35 U.S.C. 154(b) by 71 days.

(21) Appl. No.: 13/331,929

(22) Filed: Dec. 20, 2011

(65) Prior Publication Data

US 2012/0093136 A1 Apr. 19, 2012

Related U.S. Application Data

(63) Continuation of application No. 11/450,230, filed on Jun. 8, 2006, now Pat. No. 8,098,667.

(60) Provisional application No. 60/691,460, filed on Jun. 16, 2005.

(51) Int. Cl.
*H04W 72/04* (2009.01)
*H04W 4/00* (2009.01)
*H04J 3/00* (2006.01)
*H04B 1/00* (2006.01)

(52) U.S. Cl.
USPC ........ 370/395.4; 370/328; 370/329; 370/336; 455/69

(58) Field of Classification Search
USPC ................ 370/248, 329, 503, 509, 395.4; 375/354–356, 359; 455/46–516
See application file for complete search history.

(56) References Cited

U.S. PATENT DOCUMENTS

| | | | |
|---|---|---|---|
| 5,835,566 A * | 11/1998 | Cowgill | 379/15.01 |
| 5,940,006 A | 8/1999 | MacLellan et al. | |
| 6,760,587 B2 | 7/2004 | Holtzman et al. | |
| 7,012,912 B2 | 3/2006 | Naguib et al. | |
| 7,016,649 B1 | 3/2006 | Narasimhan et al. | |
| 7,042,856 B2 | 5/2006 | Walton et al. | |
| 7,047,018 B2 | 5/2006 | Buot | |
| 7,099,681 B2 | 8/2006 | O'neill | |
| 7,158,804 B2 | 1/2007 | Kumaran et al. | |
| 7,171,165 B2 | 1/2007 | Azman et al. | |
| 7,190,964 B2 | 3/2007 | Damnjanovic et al. | |
| 7,236,801 B2 | 6/2007 | Yun et al. | |

(Continued)

FOREIGN PATENT DOCUMENTS

CN 1484928 A 3/2004
EP 1089458 A2 4/2001

(Continued)

OTHER PUBLICATIONS

European Search Report—EP10180118, Search Authority—The Hague Patent Office, Dec. 7, 2010.

(Continued)

*Primary Examiner* — Afsar M Qureshi
(74) *Attorney, Agent, or Firm* — Nerrie M. Zohn

(57) ABSTRACT

Systems and methodologies are described that facilitate efficiently providing scheduling information from an access terminal to a base station to enable effectuating scheduling decisions. Access terminals may transmit scheduling information in bifurcated requests. For instance, coarse scheduling information may be transferred utilizing a dedicated out-of-band channel, and fine scheduling information may be transmitted over an in-band channel.

47 Claims, 12 Drawing Sheets

(56) References Cited

U.S. PATENT DOCUMENTS

| | | |
|---|---|---|
| 7,373,151 B1 | 5/2008 | Ahmed |
| 7,590,095 B2 | 9/2009 | Chen et al. |
| 8,098,667 B2 | 1/2012 | Julian et al. |
| 2002/0042275 A1 | 4/2002 | Kitazawa et al. |
| 2002/0111183 A1 | 8/2002 | Lundby |
| 2002/0131479 A1 | 9/2002 | Butler et al. |
| 2003/0156556 A1 | 8/2003 | Puig-Oses et al. |
| 2003/0236080 A1 | 12/2003 | Kadous et al. |
| 2004/0131014 A1 | 7/2004 | Thompson, III |
| 2004/0242257 A1 | 12/2004 | Valkealahti et al. |
| 2005/0053035 A1* | 3/2005 | Kwak et al. ............ 370/331 |
| 2005/0113106 A1 | 5/2005 | Duan et al. |
| 2006/0182022 A1 | 8/2006 | Abedi |
| 2006/0293076 A1 | 12/2006 | Julian et al. |

FOREIGN PATENT DOCUMENTS

| | | |
|---|---|---|
| JP | 2003319468 A | 11/2003 |
| KR | 20020088055 | 11/2002 |
| RU | 2216100 | 11/2003 |
| RU | 2263415 | 10/2005 |
| TW | 378481 | 1/2000 |
| TW | 512600 | 1/2002 |
| TW | 545002 | 1/2003 |
| TW | 569561 | 1/2004 |
| WO | WO0205453 A2 | 1/2002 |
| WO | WO0233848 A2 | 4/2002 |
| WO | WO0239760 A2 | 5/2002 |
| WO | WO02093782 A1 | 11/2002 |
| WO | WO2005104461 A1 | 11/2005 |
| WO | WO2006019710 | 2/2006 |

OTHER PUBLICATIONS

Goyal et al., "Start-time fair queuing: A Scheduling algorithm for integrated services packet switching networks," Distributed Multimedia Computing Laboratory, Proceedings for SIGCOMM 1996, pp. 1-12.

International Search Report—PCT/US06/023097—International Search Authority, European Patent Office—Dec. 15, 2006.

Kannan Ramchandran et al: "Multiresolution Broadcast for Digital HDTV Using Joint Source/Channel Coding", IEEE Journal of Selected Areas in Communications, IEEE Inc. New York, US, vol. 11, No. 1, Jan. 1993, pp. 6-22, XP000377993.

Larsson P, et al., "Multiuser diversity forwarding in multihop packet radio networks" IEEE Wireless Communications and Networking Conference, vol. 4, Mar. 13, 2005, pp. 2188-2194, XP010791518 IEEE, Piscataway, NJ, USA 001: 10.1109/WCNC. 2005.

Tomcik, J.: "QFDD Technology Overview Presentation," IEEE C802.20-05-59r1, pp. 1-74, Internet Citation, [Online] Nov. 15, 2005,XP002422346, Retrieved from the Internet: URL:http://ieee802.org/20/Contribs/C802.20-05-59r1.pdf> [retrieved on Feb. 27, 2007].

Wong et al., "Multi user OFDM with Adaptive Subcarrier, Bit, and Power Allocation," IEEE Journal on Selected Areas in Communications, 1999, vol. 17 (10), 1747-1758.

Written Opinion—PCT/US06/023097—International Search Authority, European Patent Office—Dec. 15, 2006.

LG Electronics Inc: "Control Information Transfer in MAC Layer", 3GPP TSG RAN WG2 Meeting #45 R2-042462, Nov. 19, 2004.

* cited by examiner

METHODS AND APPARATUS FOR EFFICIENT PROVIDING OF SCHEDULING INFORMATION

CLAIM OF PRIORITY UNDER 35 U.S.C. §119

This application is a Continuation of U.S. application Ser. No. 11/450,230 entitled "METHODS AND APPARATUS FOR EFFICIENT PROVIDING OF SCHEDULING INFORMATION" filed Jun. 8, 2006, pending, which claims the benefit of U.S. Provisional Patent application Ser. No. 60/691,460 entitled "METHODS AND APPARATUS FOR EFFICIENT PROVIDING OF SCHEDULING INFORMATION" which was filed Jun. 16, 2005. The entirety of the aforementioned applications are herein incorporated by reference.

BACKGROUND

I. Field

The following description relates generally to wireless communications, and more particularly to efficiently providing scheduling information to a centralized scheduler in a wireless communication system.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a user device. A user device within the coverage area of such base station can be employed to receive one, more than one, or all the data streams carried by the composite stream. Likewise, a user device can transmit data to the base station or another user device.

Base stations may schedule reverse link communications transferred from user devices to base stations. For instance, when employing Orthogonal Frequency Division Multiplexing (OFDM), the base station may effectuate scheduling decisions (e.g., allocate resources such as time, frequency, power, etc. to one or more user devices) pertaining to reverse link communications, and thus, the base station may facilitate maintaining orthogonality. However, conventional techniques for providing scheduling information from the user device(s) to the base station(s) may be inefficient, time-consuming and difficult. Moreover, scheduling information oftentimes may fail to be provided to a centralized scheduler (e.g., base station). By way of illustration, early voice cellular systems commonly utilize circuit switched scheduling, where each user may be assigned a dedicated circuit switched channel for a duration of a call; in this case, collection of scheduling information may occur at a very slow rate and information may be sent as high level data packets. Further, Data Only (DO) typically employs signaling layer protocol high layer data packets. Additionally, DO rev A oftentimes enables access terminals to make scheduling decisions in a distributed manner; however, such distributed scheduling may inhibit an ability to maintain orthogonality associated with reverse link communications.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating efficient providing of scheduling information from an access terminal to a base station to enable effectuating scheduling decisions. Access terminals may transmit scheduling information in bifurcated requests. For instance, coarse scheduling information may be transferred utilizing a dedicated out-of-band channel, and fine scheduling information may be transmitted over an in-band channel.

According to related aspects, a method that facilitates efficiently providing scheduling information to a central scheduler is described herein. The method may comprise transmitting coarse scheduling information via an out-of-band channel to a base station. Further, the method may include transmitting fine scheduling information via an in-band channel to the base station.

Another aspect relates to a wireless communications apparatus that may include a memory that retains data associated with scheduling information. Further, a processor may transmit coarse scheduling information via an out-of-band channel to a base station and may transmit fine scheduling information via an in-band channel to the base station.

Yet another aspect relates to a wireless communications apparatus for efficiently transferring scheduling information to a centralized scheduler to facilitate allocating in-band resources. The wireless communications apparatus may include means for transmitting coarse scheduling information via an out-of-band channel; means for obtaining an assignment for reverse link communication associated with the coarse scheduling information; and means for transmitting detailed scheduling information via an in-band channel based upon the assignment.

Still another aspect relates to a machine-readable medium having stored thereon machine-executable instructions for transmitting coarse scheduling information by way of an out-of-band channel to a base station and transmitting fine scheduling information by way of an in-band channel to the base station.

In accordance with another aspect, a processor is described herein, wherein the processor may execute instructions for transmitting coarse scheduling information over a dedicated, out-of-band channel. Further, the processor may execute instructions for transmitting fine scheduling information over an assigned, in-band channel.

According to a further aspect, a method that facilitates efficiently obtaining scheduling information is described herein. The method may comprise receiving an out-of-band transmission including coarse scheduling information. Additionally, the method may include transmitting a resources assignment based upon the coarse scheduling information. Moreover, the method may comprise receiving an in-band transmission provided based upon the resources assignment, the in-band transmission comprising fine scheduling information.

Another aspect relates to a wireless communications apparatus that may include a memory that retains data related to allocating resources associated with reverse link communication. Further, a processor may enable obtaining rough scheduling data, allocate resources based upon the rough scheduling data, receive fine scheduling data, and/or dynamically adjust the allocation of resources based upon the fine scheduling data.

Still another aspect relates to a wireless communications apparatus for efficiently receiving scheduling information to enable allocating in-band resources. The wireless communications apparatus may include means for obtaining coarse scheduling information via an out-of-band channel, means for sending a resource assignment based upon the coarse scheduling information, and means for obtaining fine scheduling information via an in-band channel effectuated utilizing the resource assignment.

Yet another aspect relates to a machine-readable medium having stored thereon machine-executable instructions for receiving an out-of-band transmission including coarse scheduling information; transmitting a resource assignment based upon the coarse scheduling information; and receiving an in-band transmission provided based upon the resource assignment including fine scheduling information.

In accordance with another aspect, a processor is described herein, wherein the processor may execute instructions for receiving coarse scheduling information by way of an out-of-band channel, transmitting a resource assignment based upon the coarse scheduling information, and receiving fine scheduling information by way of an in-band channel, the fine scheduling information provided based upon the resource assignment.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
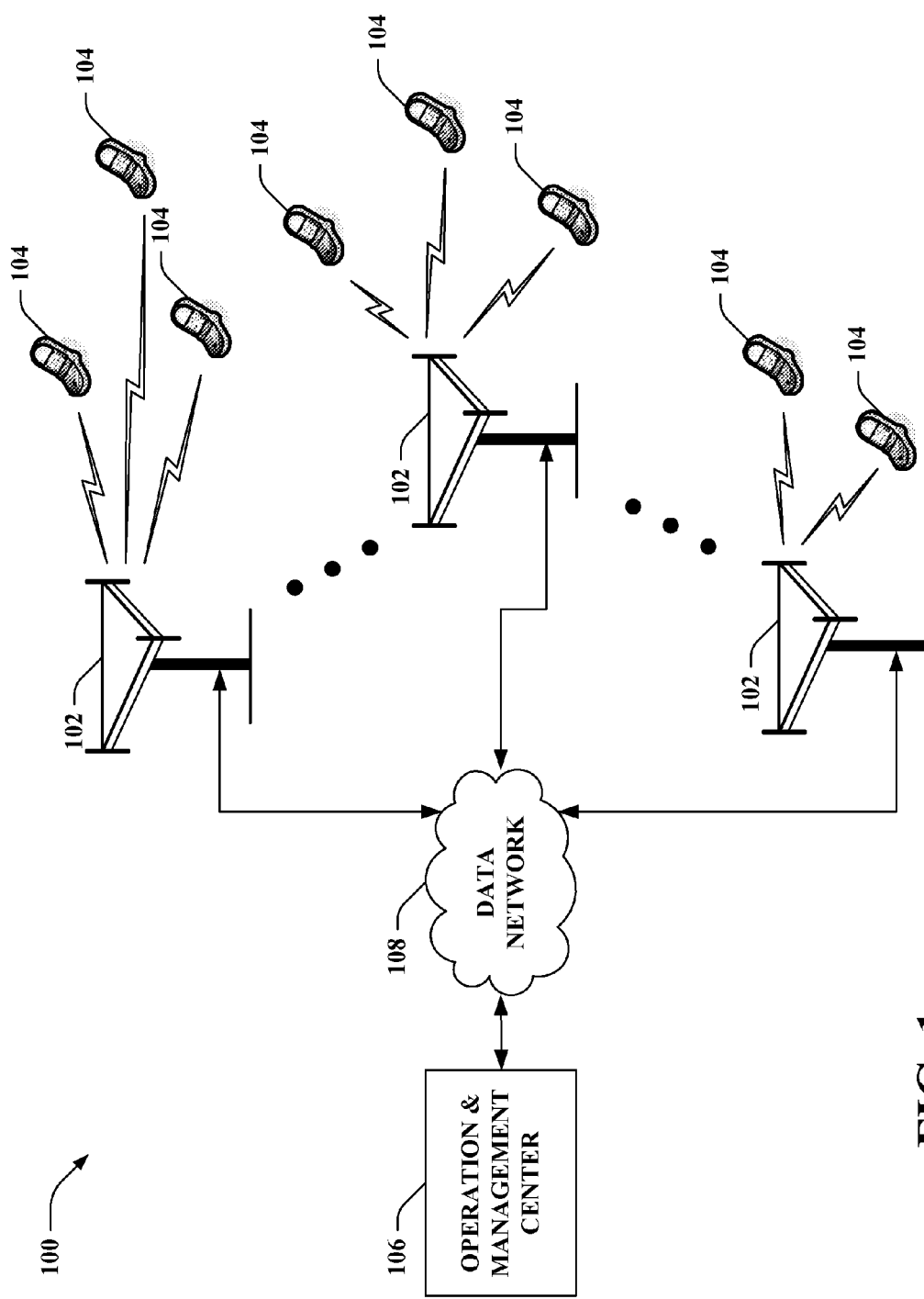
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a user terminal. A user terminal may refer to a device providing voice and/or data connectivity to a user. A user terminal may be connected to a computing device such as a laptop computer or desktop computer, or it may be a self contained device such as a personal digital assistant (PDA). A user terminal can also be called a system, a subscriber unit, a subscriber station, mobile station, mobile, remote station, access point, remote terminal, access terminal, user terminal, user agent, user device, or user equipment. A user terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem.

A base station (e.g., access point) may refer to a device in an access network that communicates over the air-interface, through one or more sectors, with user terminals. The base station may act as a router between the user terminal and the rest of the access network, which may include an IP network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 can comprise one or more base stations 102 in one or more sectors that receive, transmit, repeat, etc., wireless communication signals to each other and/or to one or more access terminals (ATs) 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Base stations 102 may be fixed stations and/or mobile and may also be referred to as access points, base transceiver systems, and the like. Access terminals 104 can be, for example, cellular phones, smart phones, laptops, handheld communication devices, handheld computing devices, satellite radios, global positioning systems, PDAs, and/or any other suitable device for communicating over wireless communication system 100. Access terminals 104 may be fixed or mobile and may also be referred to as mobile stations, user equipment (UE), user terminals, wireless devices, handsets, etc.

Each access terminal 104 may communicate with one or multiple base stations 102 on a forward link and/or reverse link at any given moment. The forward link (FL) refers to the communication link from base stations 102 to access terminals 104, and the reverse link (RL) refers to the communication link from access terminals 104 to base stations 102. Base stations 102 may further communicate with an operation and management center 106 via a data network 108 (e.g., the Internet). Operation and management center 106 may perform functions such as, for example, authentication and authorization of access terminals 104, accounting, billing, and so on.

System 100 enables providing scheduling information from access terminals 104 to base stations 102 in an efficient manner. Such information may be utilized by base stations 102 to schedule reverse link communications. By way of employing centralized scheduler(s) associated with base stations 102, orthogonality between transmissions occurring within system 100 may be preserved.

System 100 effectuates efficient transfer of scheduling information via utilizing bifurcated requests from access terminals 104 to base stations 102. For example, coarse scheduling information may be transmitted through out-of-band signaling and more detailed scheduling information may be provided through in-band signaling. Coarse information may be transmitted to base station 102 via a dedicated channel, for instance. By way of illustration, coarse information may include data related to buffer levels of access terminals 104, quality of service (QoS) associated with access terminals 104, and the like. Pursuant to a further example, detailed scheduling information may be included as header(s) associated with data packet(s) transmitted after an access terminal 104 obtains an assignment from a base station 102 in response to a coarse, out-of-band schedule request. Access terminal 104 may transmit packet(s) over the reverse link in accordance with such assignment, and the packet(s) may include additional scheduling information that may be employed by base station 102. According to an example, the coarse information may indicate a range including a number of bits that access terminal 104 has to transmit, such as more than 1000 bits, more than 0 bits but less than 1000 bits, or 0 bits, and the detailed scheduling information may describe the number of bits to be transmitted to a 1 bit precision. Additionally or alternatively, the coarse information may be that QoS flow priority 1 has at least 1000 bits to send, while the detailed scheduling information may be the number of bits in each non-empty QoS flow to some precision.

Figure 2:
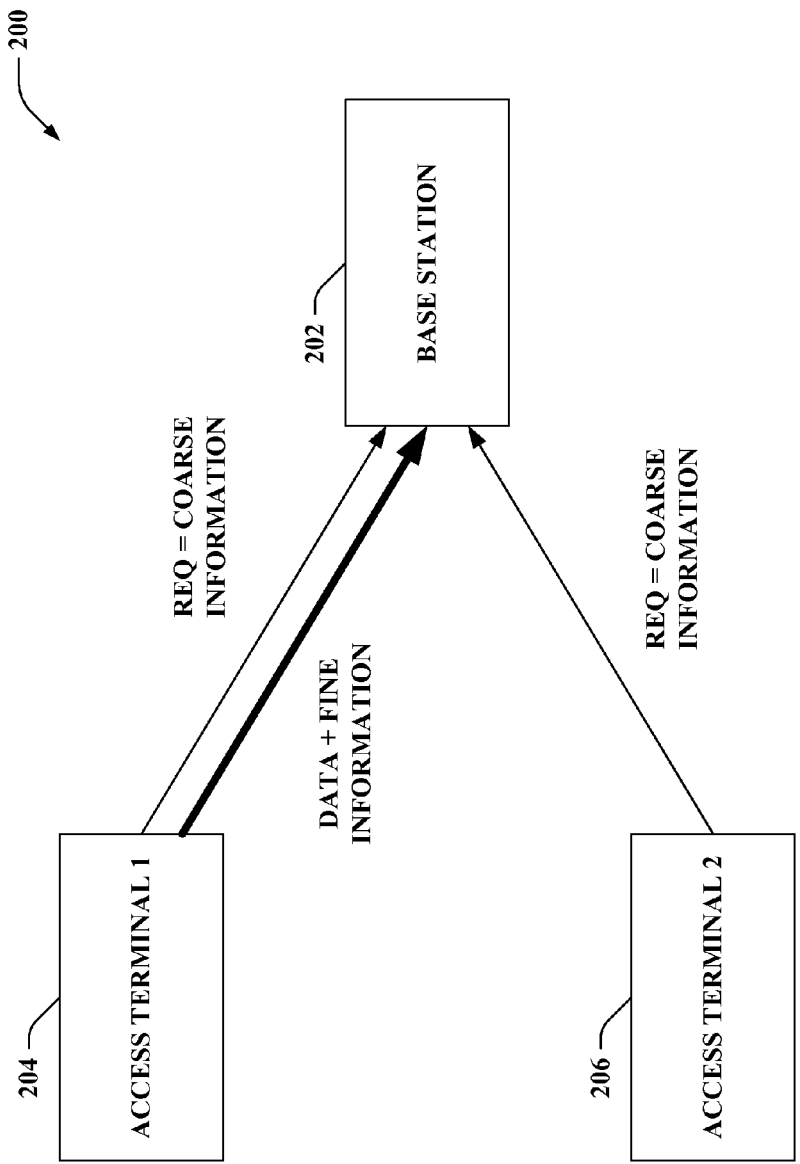
FIG. 2 is an illustration of a system that efficiently provides information to a base station to facilitate scheduling associated with reverse link communications.

With reference to FIG. 2, illustrated is a system 200 that efficiently provides information to a base station 202 to facilitate scheduling associated with reverse link communications. System 200 may include any number of access terminals such as access terminal 1 204 and access terminal 2 206. Base station 202 may employ a central packet-based scheduler for the reverse link. Further, base station 202 may gather information to make assignments, determine an allocation of resources to each access terminal 204-206, and transmit the assignments to access terminals 204-206.

Access terminals 204-206 efficiently provide information pertaining to scheduling to base station 202. Each access terminal 204-206 may transmit coarse information in a dedicated out-of band channel to base station 202. Also, access terminals 204-206 may send finer scheduling related information to base station 202. For instance, the finer information may be appended to data packets transmitted to base station 202 in accordance with a resource assignment (e.g., scheduled time, assigned subcarriers, packet format, etc.). Thus, the additional scheduling information may be provided via in-band communications effectuated with the assigned resources.

Access terminals 204-206 may transmit any information utilized in connection with scheduling. For instance, the information may include a buffer size of an access terminal, queue-latency measure for Quality of Service (QoS) purposes, buffer sizes for multiple QoS, head of line packet latency, power control parameters such as a transmit power or transmit power spectral density, maximum power constraints of an access terminal, and so forth. Each access terminal 204-206 may transmit coarse information in a dedicated out-of-band channel. For example, the coarse information may include a 2 bit buffer level and a 2 bit QoS level; however, the claimed subject matter is not so limited. By way of illustration, the dedicated channel may be useful for obtaining a data channel; thus, a request may be transmitted via the dedicated out-of-band channel to base station 202 to enable receiving an in-band data channel assignment. According to a further example, after an access terminal (e.g., access terminal 1 204)

is scheduled, such access terminal may transmit fine information in-band in accordance with the resource assignment obtained in response to the out-of-band transmission. Additionally or alternatively, the scheduled access terminal (e.g., access terminal 1 204) may transfer any disparate data via the scheduled in-band channel.

Figure 3:
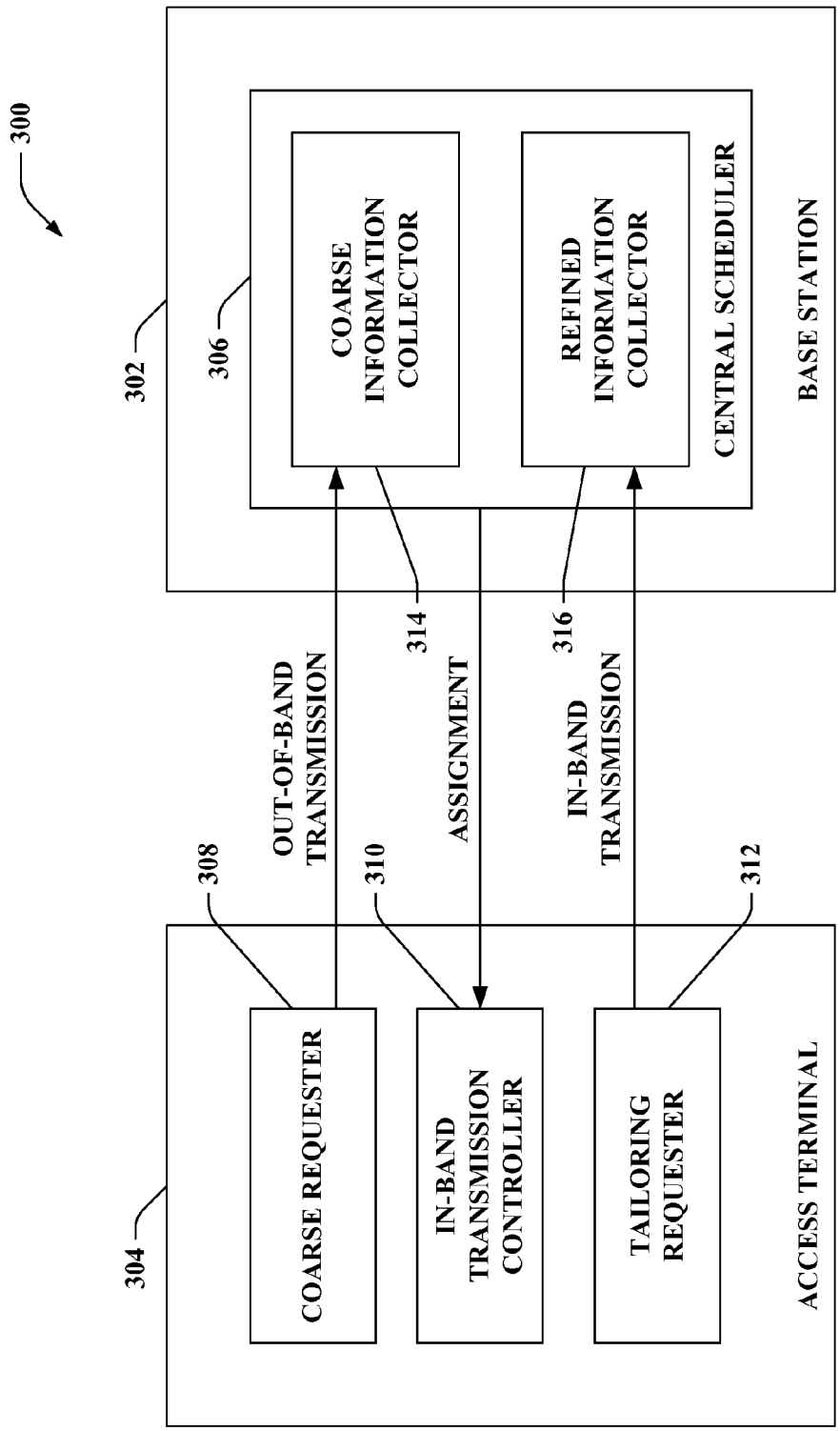
FIG. 3 is an illustration of a system that bifurcates transmission of requests utilized for assigning resources associated with reverse link communication.

Turning to FIG. 3, illustrated is a system 300 that bifurcates transmission of requests utilized for assigning resources associated with reverse link communication. Although one base station 302 and one access terminal 304 are depicted, it is to be appreciated that system 300 may include any number of base stations and any number of access terminals. Access terminal 304 may efficiently provide request(s) to base station 302. Base station 302 may further include a central scheduler 306 that assigns resources to access terminal 304 (and/or any disparate access terminal(s) similar to access terminal 304 that likewise provides request(s)). Central scheduler 306 may assemble information from access terminal 304 (and/or disparate access terminal(s)), allocate resources to access terminal 304 (and/or disparate access terminal(s)), and transmit an assignment to access terminal 304 (and/or disparate access terminal(s)).

Access terminal 304 may further include a coarse requester 308, an in-band transmission controller 310 and a tailoring requester 312. Also, central scheduler 306 of base station 302 may include a coarse information collector 314 and a refined information collector 316. Coarse requester 308 may send an out-of-band transmission to base station 302; the out-of-band transmission may be obtained by coarse information collector 314 and thereafter evaluated (e.g., by central scheduler 306) to allocate resources. Coarse requester 308 may transmit coarse information via a dedicated channel, which may be a Code Division Multiple Access (CDMA) channel, a Time Division Multiple Access (TDMA) channel, a Frequency Division Multiple Access (FDMA) channel, an OFDMA channel, a combination thereof, and the like. For example, the dedicated channel may be a low overhead request channel. Additionally or alternatively, the dedicated channel over which the coarse requester 308 provides information may be a contention free channel. Coarse requester 308 (and/or access terminal 304) may automatically select when to send scheduling parameters to base station 302 and/or may periodically cycle through the parameters. Further, it is to be appreciated that base station 302 may request certain parameters from access terminal 304.

Coarse information collector 314 and/or central scheduler 306 may evaluate coarse information received from coarse requester 308 and provide an assignment in response to access terminal 304. According to an example, system 300 may employ Orthogonal Frequency Division Multiple Access (OFDMA) in connection with in-band communication. Pursuant to this example, the resource assignment provided by central scheduler 306 may be a number of subcarriers (e.g., subset of available subcarriers). However, the claimed subject matter is not limited to the aforementioned example and rather contemplates any type of in-band communication (e.g., CDMA, TDMA, FDMA, etc.) and/or allocation of any resource employed in associated with reverse link communication.

Central scheduler 306 may transmit the assignment to access terminal 304. Pursuant to an illustration, the assignment may be provided to in-band transmission controller 310. In-band transmission controller 310 may enable access terminal 304 to send a reverse link transmission to base station 302 in accordance with the received assignment. The obtained assignment may enable in-band transmission controller 310 to permit transmission of one or more packets over the reverse link; thus, control overhead may be reduced as compared with conventional techniques that utilize an assignment for each packet. Additionally, tailoring requester 312 may transfer additional information utilized in connection with scheduling upon a reverse link via an in-band transmission. Such additional information may be obtained by refined information collector 316 and thereafter employed by central scheduler 306 to modify assignment(s) (e.g., pertaining to current and/or future transmission(s)) related to reverse link communications. According to an illustration, out-of-band transmissions of scheduling information effectuated with coarse requester 308 and in-band transfers of scheduling information by tailoring requester 312 may occur at disparate times. Pursuant to a further example, overhead may be reduced by employing coarse requester 308 and tailoring requester 312. In accordance with this example, a rough approximation of resources may be provided to centralized scheduler 306 with coarse requester 308, which may be utilized to initially allocate resources, and thereafter tailoring requester 312 may append further data related to time frame, buffer size, power level, and the like to enable dynamically altering allocation of resources for access terminal 304.

Various information may be determined by access terminal 304 and/or provided from access terminal 304 to base station 302 for utilization by central scheduler 306. For instance, access terminal 304 may employ a distributed power control algorithm that determines the data channel transmit power spectral density, where the power spectral density (PSD) is the amount of transmit power per subcarrier. Also, access terminal 304 may provide information related to a maximum transmit power, which enables determining a maximum number of subcarriers that access terminal 304 may support at the determined PSD related to access terminal 304. Further, access terminal 304 may be associated with several QoS flows, such as best effort data, control, and voice. For latency sensitive QoS flows, such as voice, the queue may have an associated latency related to a maximum amount of time that any packet has been in the queue.

Coarse requester 308 may utilize a dedicated periodic request (REQ) channel associated with access terminal 304 on which to send coarse information. For example, the REQ channel may be a 4-bit REQ channel where the first 2 bits indicate a highest QoS level of data to be sent by access terminal 304, and the second 2 bits indicate the maximum number of subcarriers that access terminal 304 may support in a course manner, such as 1-8, 9-16, 17-32, or more than 32. The maximum number of subcarriers may be determined (e.g., by access terminal 304, coarse requester 308, etc.) as the lesser of the following: a number of subcarriers supportable based on buffer level and a number of subcarriers supportable based on maximum power constraints.

Access terminal 304 may determine the number of supportable subcarriers based on buffer level by determining a data spectral density. For instance, data spectral density may be in bits per packet per subcarrier. The supportable number of subcarriers may be obtained by dividing a number of bits in a buffer associated with access terminal 304 by the data spectral density. The data spectral density may be based on a power control determined power spectral density.

The data spectral density may be evaluated from the PSD in various manners. For instance, a last reported PSD level may be utilized to determine the data spectral density. Additionally or alternatively, a decaying version of the last reported PSD level may be employed to evaluate the data spectral density. One skilled in the art would appreciate that any predictive technique may be utilized to predict the data spectral density that base station 302 and/or access terminal 304 may assign to determine the data spectral density. Further, it is contemplated that the number of subcarriers may be determined based on total buffer size, highest QoS level buffer size, reported QoS level buffer size, or some other function of various buffer sizes.

Access terminal 304 may further determine the number of subcarriers supportable based on maximum power constraints. Accordingly, access terminal 304 may divide a maximum transmit power associated with access terminal 304 by the power control determined PSD. Additionally or alternatively, access terminal 304 may utilize a filtered average of the PSD level, a filtered maximum number of subcarriers, or a predicated maximum number of subcarriers.

Figure 4:
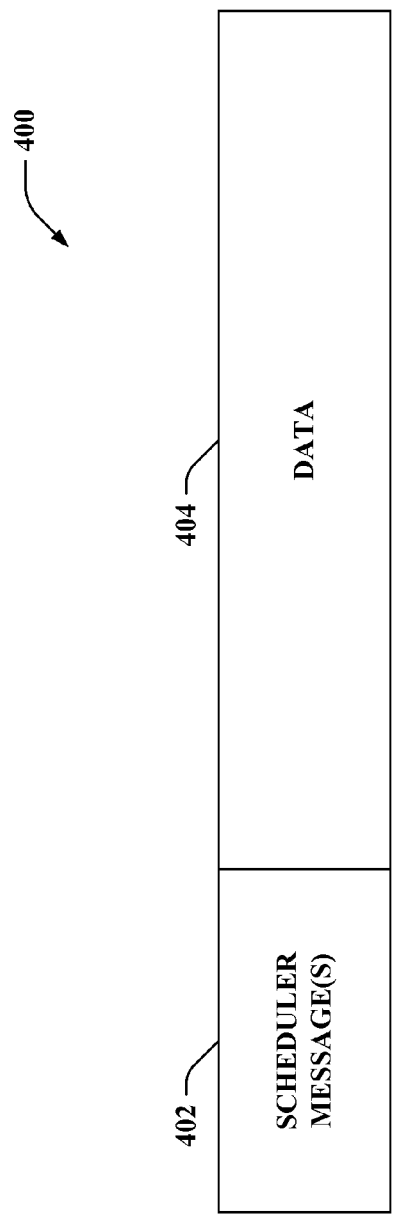
FIG. 4 is an illustration of an exemplary data packet that may be transmitted upon an in-band channel by an access terminal to a base station.

With reference to FIG. 4, illustrated is an exemplary data packet 400 that may be transmitted upon an in-band channel by an access terminal to a base station. Data packet 400 may be transferred upon a reverse link in accordance with an assignment obtained in response to a coarse, out-of-band request. Data packet 400 may include a packet header that comprises information (e.g., 1-bit) indicating an inclusion of additional scheduler information (e.g., scheduler message(s) 402) within data packet 400. If the bit is set, data packet 400 includes one or more scheduler messages 402. According to an example, a field may indicate a number of scheduler message(s) 402. Pursuant to a further illustration, a continuation bit may be included in each of the scheduler message(s) 402 that indicates if additional scheduler message(s) 402 are included as part of data packet 400.

It is to be appreciated that any information utilized in connection with scheduling reverse link communications may be included as part of scheduler message(s) 402. For instance, scheduler message(s) 402 may include information associated with buffer size of each QoS flow, head of line latency of each QoS flow, power control transmit power spectral density, maximum number of subcarriers supported at the transmit power spectral density, and so forth. For parameters specific to QoS flows, the QoS flow may be explicitly and/or implicitly indicated; implicit indication may include an order of indicating the buffer levels. Transmit power spectral density may be expressed as an offset from a reference level, such as an offset from a power controlled pilot or a control channel power controlled to a given level of performance. Remaining scheduled bits may be utilized for data transmission (e.g., data 404); thus, fine grained scheduling information may be efficiently included with the scheduled data transmissions.

Further, it is contemplated that fine grained scheduling information (e.g., provided via in-band signaling) may be utilized to modify current transmission(s) and/or transmission(s) occurring at a later scheduled time. For example, the fine grained scheduling information (e.g., provided by tailoring requester 312 of FIG. 3) may include data in one or more scheduler message(s) 402 that relate to data packet format alterations. Thus, an access terminal may indicate to a base station that a next packet send over the reverse link, in-band channel may be in a particular format. Pursuant to another illustration, any modification associated with resource allocation may be dynamically effectuated based at least in part upon the fined grained scheduling information.

Figure 5:
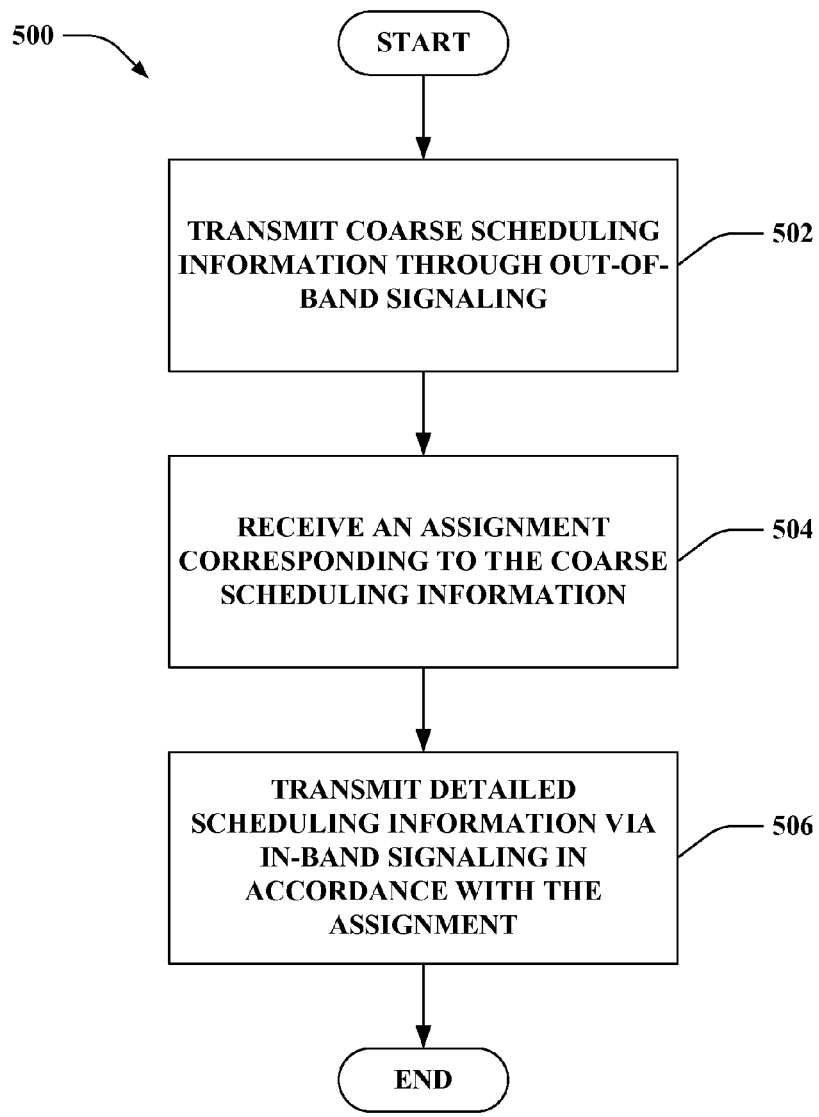
FIG. 5 is an illustration of a methodology that facilitates efficiently providing scheduling information from an access terminal to a base station.
Figure 6:
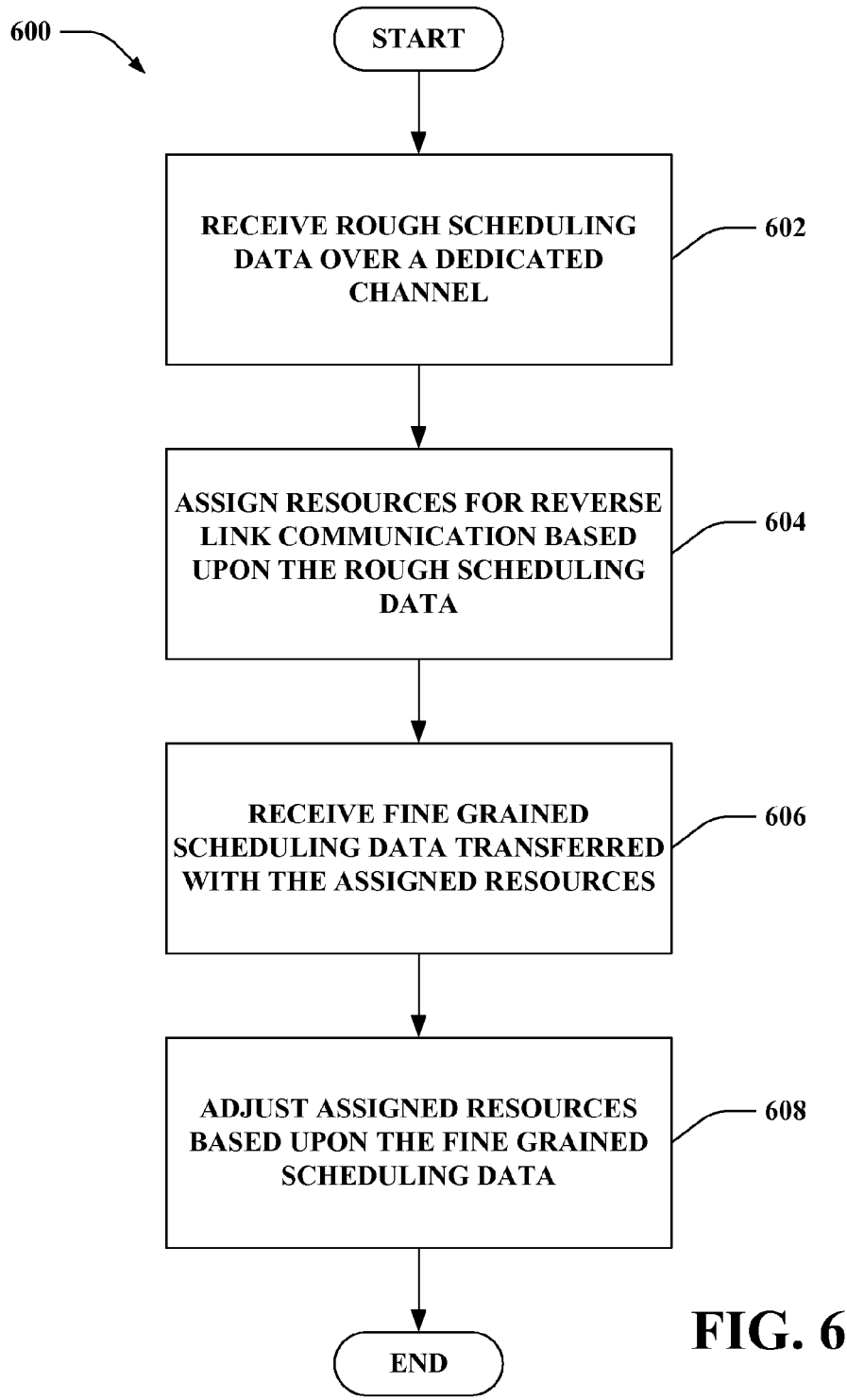
FIG. 6 is an illustration of a methodology that facilitates efficiently obtaining scheduling information at a central scheduler.
Figure 7:
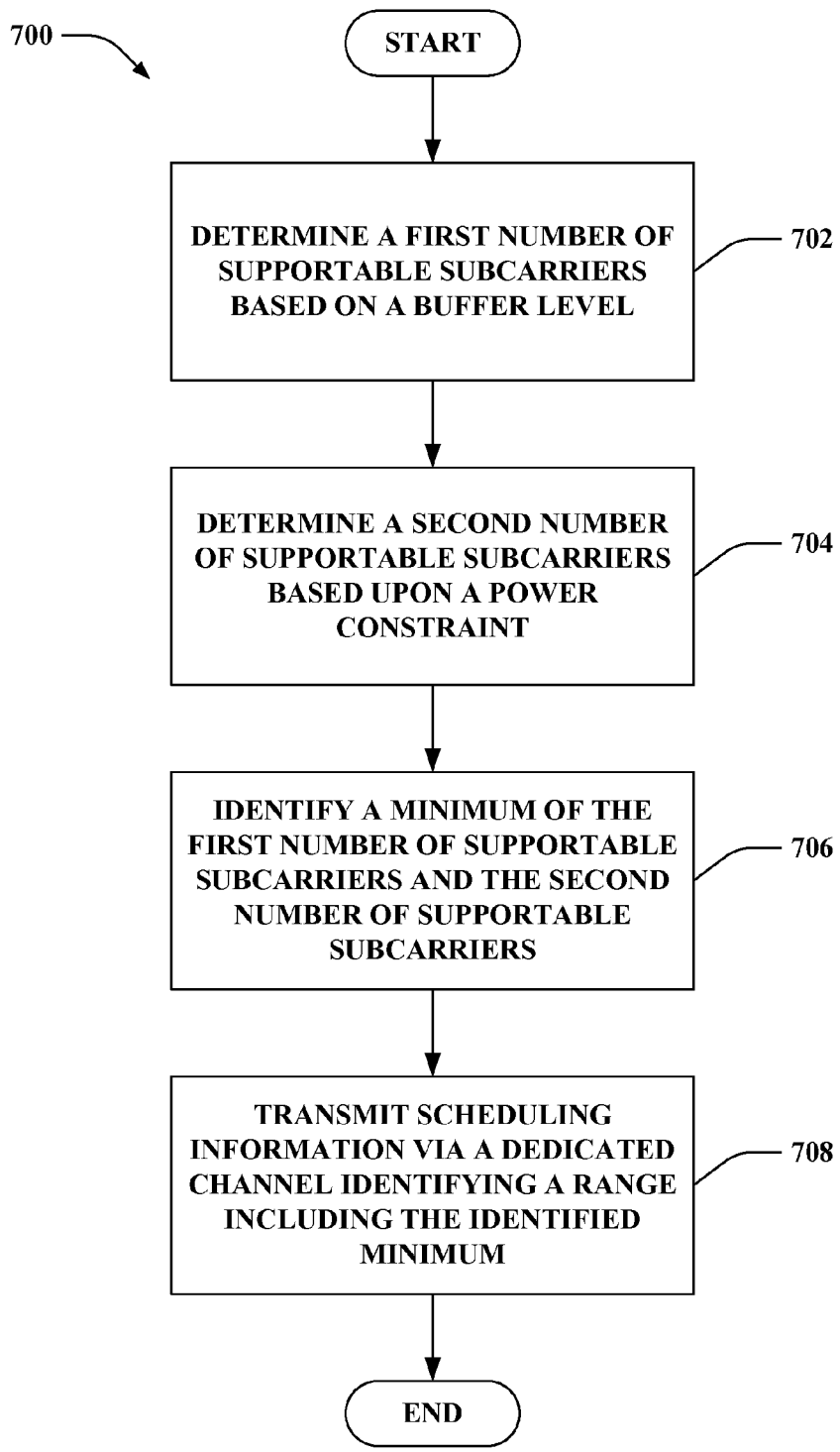
FIG. 7 is an illustration of a methodology that facilitates providing coarse scheduling information to a central scheduler.

Referring to FIGS. 5-7, methodologies relating to efficiently providing scheduling information pertaining to communication upon a reverse link to a centralized scheduler are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

With reference to FIG. 5, illustrated is a methodology 500 that facilitates efficiently providing scheduling information from an access terminal to a base station. At 502, coarse scheduling information may be transmitted through out-of-band signaling. For instance, the coarse scheduling information may be transferred over a dedicated channel. It is contemplated that such dedicated channel may be a CDMA channel, a TDMA channel, a FDMA channel, an OFDMA channel, a combination thereof, and the like. The coarse scheduling information may include information pertaining to buffer level(s), QoS level(s), power constraint(s), supportable subcarriers, and so forth.

At 504, an assignment corresponding to the coarse scheduling information may be received. The assignment may allocate any resources associated with reverse link communication. For example, the assignment may allocate subcarrier(s), time(s), power(s), packet format(s), etc. to be employed in connection with reverse link transmission. At 506, detailed scheduling information may be transmitted via in-band signaling in accordance with the assignment. Pursuant to an illustration, data packet(s) may be transmitted on the reverse link as assigned and such data packet(s) may include additional, fine grained scheduling information. According to an example, the additional scheduling information may be included as one or more headers associated with the data packet(s). The additional scheduling information may facilitate dynamically adjusting reverse link assignment(s) of resources. Further, the additional scheduling information may indicate a format of one or more of the data packets transmitted in-band.

Turning to FIG. 6, illustrated is a methodology 600 that facilitates efficiently obtaining scheduling information at a central scheduler. At 602, rough scheduling data may be received over a dedicated channel. Pursuant to an example, rough scheduling data may be obtained from any number of access terminals. According to this example, rough scheduling data may be received over contention free channels dedicated to each of the access terminals. For instance, rough scheduling data may periodically be obtained from each of the access terminals at respective times; however, the claimed subject matter is not so limited. At 604, recourses for reverse link communication may be assigned based upon the rough scheduling data. Further, the assignment may be transmitted to a corresponding access terminal. The resources may include, for instance, subcarrier(s), time slot(s), power level(s), packet format(s), and the like. According to an illustration, the rough scheduling data may include an indication of a maximum number of supportable subcarriers; thus, if available, such number of subcarriers may be assigned to the access terminal from which the rough scheduling data was obtained for reverse link communication.

At 606, fine grained scheduling data transferred with the assigned resources may be received. The fine grained scheduling data may be included as one or more header(s) appended to disparate data obtained from in-band communication. At 608, the assigned resources may be adjusted based upon the fine grained scheduling data. Thus, low overhead, rough scheduling data may be obtained through out-of-band channels and fine grained scheduling data may be received through in-band channels, thereby enabling efficient receipt of such information.

Now referring to FIG. 7, illustrated is a methodology 700 that facilitates providing coarse scheduling information to a central scheduler. At 702, a first number of supportable subcarriers may be determined based on a buffer level. For instance, the first number of supportable subcarriers may be evaluated by dividing a number of bits in a buffer by a data spectral density (e.g., bits per packet per subcarrier). At 704, a second number of supportable subcarriers may be determined based upon a power constraint. For example, the second number of supportable subcarriers may be identified by dividing a maximum transmit power of an access terminal by a power control determined power spectral density (PSD). At 706, a minimum between the first number of supportable subcarriers and the second number of supportable subcarriers may be identified. At 708, scheduling information may be transmitted via a dedicated channel. The scheduling information may identify a range including the identified minimum. Thus, a coarse indication of the maximum number of supportable subcarriers may be efficiently provided to a central scheduler. Additionally, it is contemplated that further refined scheduling information may be provided via in-band communication.

It will be appreciated that, in accordance with one or more aspects described herein, inferences can be made regarding efficiently providing scheduling information, determining how to bifurcate requests including the scheduling information, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding determining how to bifurcate scheduling information efficiently for transmission via out-of-band and in-band channels. By way of further illustration, an inference may be made pertaining to determining data spectral density levels associated with access terminals. It will be appreciated that the foregoing examples are illustrative in nature and are not intended to limit the number of inferences that can be made or the manner in which such inferences are made in conjunction with the various embodiments and/or methods described herein.

Figure 8:
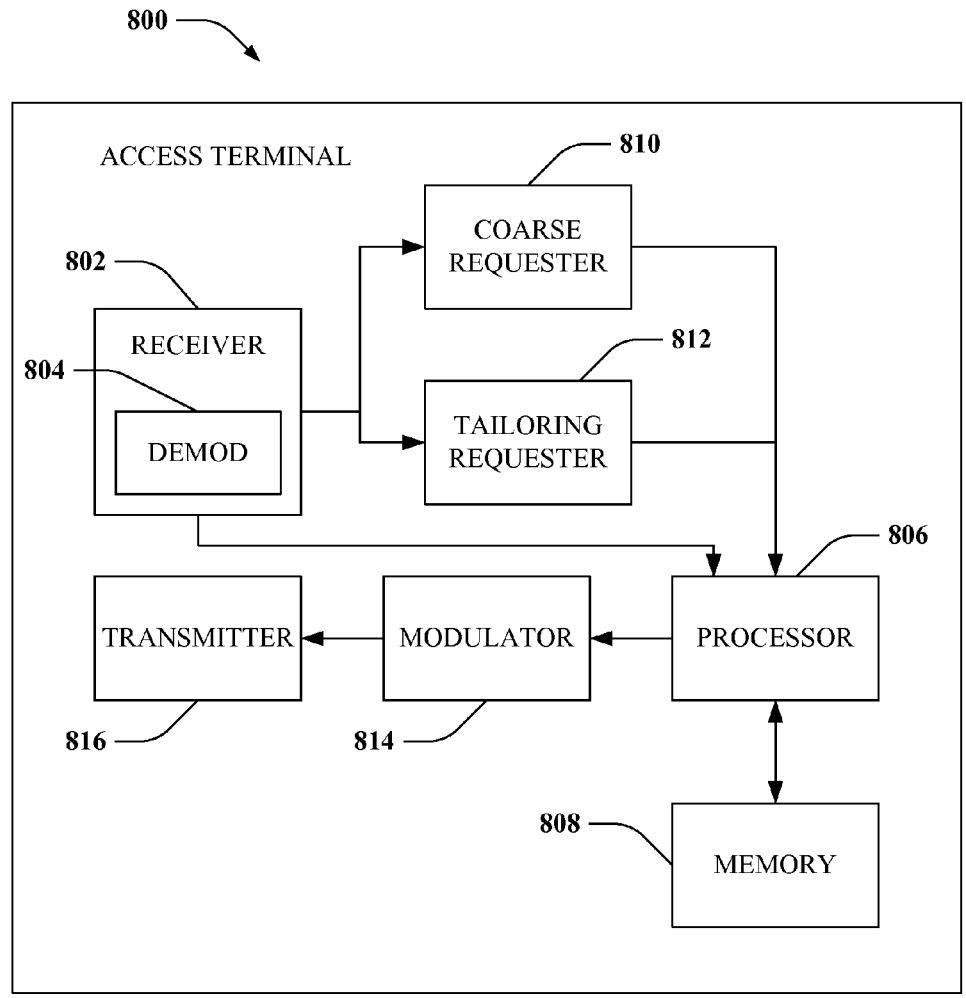
FIG. 8 is an illustration of an access terminal that facilitates efficiently transferring reverse link scheduling information.

FIG. 8 is an illustration of an access terminal 800 that facilitates efficiently transferring reverse link scheduling information. Access terminal 800 comprises a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of access terminal 800, and/or a processor that both analyzes information received by receiver 802, generates information for transmission by transmitter 816, and controls one or more components of access terminal 800.

Access terminal 800 can additionally comprise memory 808 that is operatively coupled to processor 806 and that may store data to be transmitted, received data, and the like. Memory 808 may store information utilized for scheduling such as, for example, data related to a buffer size of access terminal 800, buffer sizes for multiple QoS, head of line packet latency, queue-latency measures for QoS purposes, power control parameters, etc.

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Receiver 802 is further operatively coupled to a coarse requester 810 that generates a request that may be transmitted via transmitter 816 over a dedicated, out-of-band channel. Coarse requester 810 may assemble scheduling information utilized to obtain an assignment of resources associated with a reverse link from a centralized scheduler. For instance, coarse requester 810 may automatically effectuate transmitting the out-of-band, rough request. Additionally or alternatively, coarse requester 810 may periodically transmit such requests. According to another illustration, information may be obtained by receiver 802 that initiates generation and/or transmission of the request by coarse requester 810 (e.g., via transmitter 816). Further, coarse requester 810 may transmit coarse scheduling information in response to data arrival (e.g., a non-empty buffer).

Additionally, a tailoring requester 812 may utilize allocated resources related to a reverse link and transmit additional, refined scheduling information in-band. By way of illustration, subcarrier(s), time(s), power level(s), packet format(s), etc. may be assigned to access terminal 800 for reverse link communication; thus, tailoring requester 812 may append further scheduling information (e.g., header(s)) to data transmitted over the reverse link in accordance with the assigned subcarrier(s), time(s), power level(s), packet format(s), etc. Tailoring requester 812 may facilitate transmitting refined scheduling information via transmitter 816 to enable dynamically modifying resource assignment pertaining to access terminal 800. Access terminal 800 still further comprises a modulator 814 and a transmitter 816 that transmits the signal to, for instance, a base station, another user device, a remote agent, etc. Although depicted as being separate from the processor 806, it is to be appreciated that coarse requester 810, tailoring requester 812 and/or modulator 814 may be part of processor 806 or a number of processors (not shown).

Figure 9:
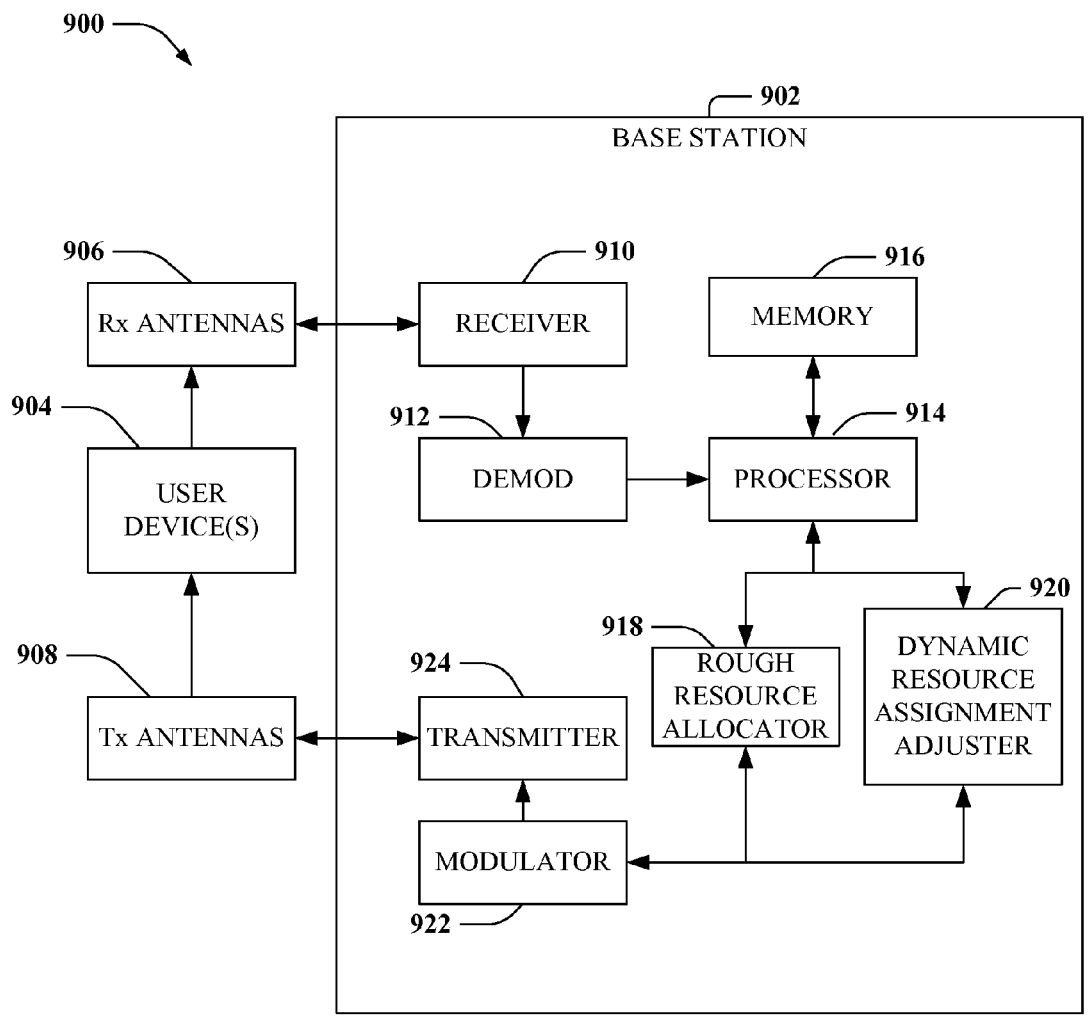
FIG. 9 is an illustration of a system that facilitates efficiently obtaining scheduling information utilized to coarsely assign and/or adjust allocation of resources associated with reverse link communication.

FIG. 9 is an illustration of a system 900 that facilitates efficiently obtaining scheduling information utilized to coarsely assign and/or adjust allocation of resources associated with reverse link communication. System 900 comprises a base station 902 with a receiver 910 that receives signal(s) from one or more user devices 904 through a plurality of receive antennas 906, and a transmitter 924 that transmits to the one or more user devices 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores information related to allocating resources associated with reverse link communication (e.g., data associated with buffer level(s), QoS level(s), power constraint(s), etc. related to user device(s) 904) that may be measured and/or received from user device(s) 904 (or a disparate base station (not shown)), and/or any other suitable information related to performing the various actions and functions set forth herein. Processor 914 is further coupled to a rough resource allocator 918 that evaluates obtained coarse scheduling information from user device(s) 904 to yield an assignment that is transmitted to user device(s) 904. Rough resource allocator 918 may analyze out-of-band scheduling information provided via a dedicated channel. By way of illustration and not limitation, the out-of-band scheduling information evaluated by rough resource allocator 918 may be a 4-bit request that includes an indication of a highest QoS level of data to be transmitted and a range describing a maximum number of subcarriers supported by a user device. It is to be appreciated that rough resource allocator 918 may be included in a central scheduler (e.g., central scheduler 306 of FIG. 3) associated with base station 902.

Processor 914 may be further coupled to a dynamic resource assignment adjuster 920 that can enable modifying resource assignment based upon obtained in-band scheduling information. For instance, dynamic resource assignment adjuster 920 may analyze scheduling information provided as header(s) in data packet(s) received over a reverse link transferred in accordance with the assignment yielded by rough resource allocator 918. Dynamic resource assignment adjuster 920 may also be included in a central scheduler. Dynamic resource assignment adjuster 920 and/or rough resource allocator 918 may be further coupled to a modulator 922. Modulator 922 may multiplex assignment information for transmission by a transmitter 926 through antenna 908 to user device(s) 904. Although depicted as being separate from processor 914, it is to be appreciated that rough resource allocator 918, dynamic resource assignment adjuster 920 and/or modulator 922 may be part of processor 914 or a number of processors (not shown).

Figure 10:
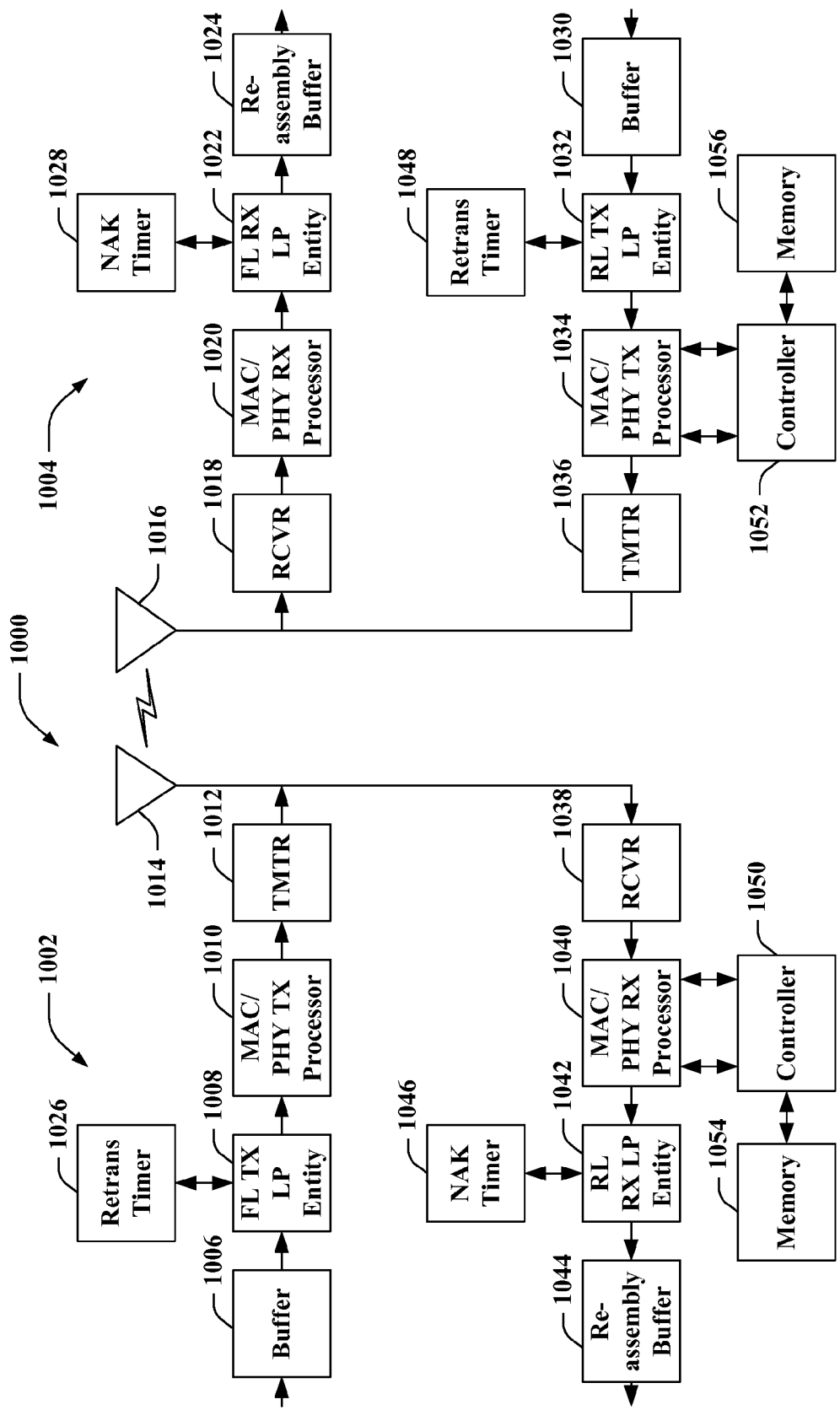
FIG. 10 is an illustration of a wireless network environment that can be employed in conjunction with the various systems and methods described herein.

FIG. 10 shows an exemplary wireless communication system 1000. The wireless communication system 1100 depicts one access point 1002 (e.g., base station) and one terminal 1004 (e.g., access terminal) for sake of brevity. However, it is to be appreciated that system 1000 can include more than one access point and/or more than one terminal, wherein additional access points and/or terminals can be substantially similar or different for the exemplary access point 1002 and terminal 1004 described below. In addition, it is to be appreciated that access point 1002 and/or terminal 1004 can employ the systems (FIGS. 1-3 and 8-9) and/or methods (FIGS. 5-7) described herein to facilitate wireless communication there between.

Referring now to FIG. 10, a forward link (FL) facilitates data transmission from access point 1002 to access terminal 1004. A reverse link (RL) facilitates data transmission from access terminal 1004 to access point 1002. Access point 1002 may transmit data to one or multiple access terminals simultaneously on the forward link. Access terminal 1004 may transmit the same data to one or multiple access points on the reverse link.

For forward link data transmission, at access point 1002, a buffer 1006 receives and stores data packets from higher layer applications. An FL TX LP entity 1008 performs processing on the data packets in buffer 1006 and provides a frame sequence containing frames. A MAC/PHY TX processor 1010 performs forward link MAC and physical layer processing (e.g., multiplexing, encoding, modulation, scrambling, channelization, etc.) on the frame sequence from entity 1008 and provides a stream of data samples. A transmitter unit (TMTR) 1012 processes (e.g., converts to analog, amplifies, filters, and frequency up converts) the data sample stream from processor 1010 and generates a forward link signal, which is transmitted via an antenna 1014.

At access terminal 1004, the forward link signal from access point 1002 is received by antenna 1016 and processed (e.g., filtered, amplified, frequency downconverted, and digitized) by a receiver unit (RCVR) 1018 to obtain received samples. A MAC/PHY RX processor 1020 performs forward link MAC and physical layer processing (e.g., dechannelization, descrambling, demodulation, decoding, demultiplexing, etc.) on the received samples and provides a received frame sequence. An FL RX LP entity 1022 performs receiver processing on the received frame sequence and provides decoded data to a re-assembly buffer 1024. FL RX LP entity 1022 may also generate NACKs for data detected to be missing and may also generate ACKs for data correctly decoded. The NACKs and ACKs are sent via the reverse link to access point 1002 and provided to FL TX LP entity 1008, which performs retransmission of the missing data if any. A retransmit timer 1026 facilitates retransmission of the last frame to flush out the buffer. A NACK timer 1028 facilitates retransmission of NACKs. These timers are described below.

For reverse link data transmission, at access terminal 1004, a buffer 1030 receives and stores data packets from higher layer applications. An RL TX LP entity 1032 performs processing on the data packets in buffer 1030 and provides a frame sequence containing frames. A MAC/PHY TX processor 1034 performs reverse link MAC and physical layer processing on the frame sequence from entity 1032 and provides a stream of data samples. A transmitter unit (TMTR) 1036 processes the data sample stream from processor 1034 and generates a reverse link signal, which is transmitted via antenna 1016.

At access point 1002, the reverse link signal from access terminal 1004 is received by antenna 1014 and processed by a receiver unit (RCVR) 1038 to obtain received samples. A MAC/PHY RX processor 1040 performs reverse link MAC and physical layer processing on the received samples and provides received frame sequence. An RL RX LP entity 1042 performs receiver processing on the received frame sequence and provides decoded data to a re-assembly buffer 1044. RL RX LP entity 1042 may also generate NACKs (e.g., utilizing a NAK timer 1046) for data detected to be missing and may also generate ACKs for data correctly decoded. The NACKs and ACKs are sent via the forward link to access terminal 1004 and provided to RL TX LP entity 1032, which performs retransmission of the missing data if any (e.g., utilizing a retransmission timer 1048). The FL and RL are described in detail below. In general, ACK and/or NACK feedback may be sent by a link protocol (LP), and ACK and/or NACK feedback may also be sent by the physical layer.

Controllers 1050 and 1052 direct operation at access point 1002 and access terminal 1004, respectively. Memory units 1054 and 1056 store program codes and data used by controllers 1050 and 1052, respectively, for implementing the disclosed embodiments.

For a multiple-access system (e.g., FDMA, OFDMA, CDMA, TDMA, etc.), multiple terminals can transmit concurrently on the uplink. For such a system, a pilot subbands may be shared among different terminals. Channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory units 1054 and 1056 and executed.

Figure 11:
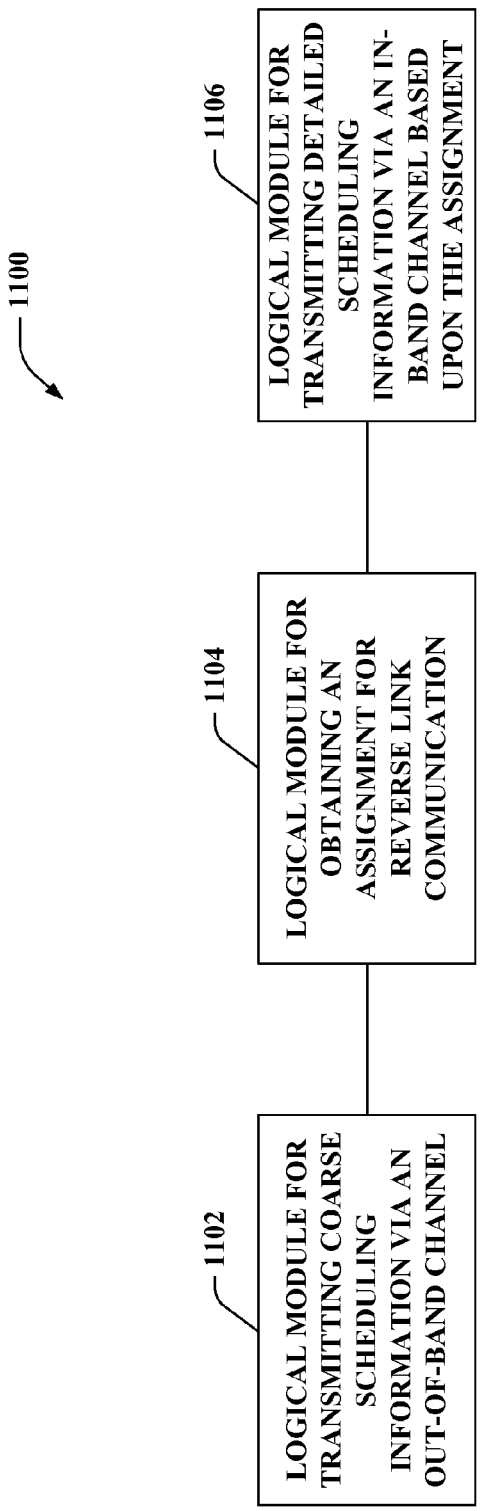
FIG. 11 is an illustration of a system that efficiently transfers scheduling information to a centralized scheduler to facilitate allocating in-band resources.

With reference to FIG. 11, illustrated is a system 1100 that efficiently transfers scheduling information to a centralized scheduler to facilitate allocating in-band resources. It is to be appreciated that system 1100 is represented as including functional blocks, which can be functional blocks that represent functions implemented by a processor, software, or combination thereof (e.g., firmware). System 1100 can be implemented in a wireless device and can include a logical module for transmitting coarse scheduling information via an out-of-band channel 1102. For example, a request may be transferred over a dedicated channel (e.g., automatically, periodically, in response to receiving data from a disparate source, etc.) that includes rough information related to buffer level(s), QoS level, number of supportable subcarriers, and the like. Further, system 1100 may comprise a logical module for obtaining an assignment for reverse link communication 1104. Pursuant to an illustration, the assignment may be related to subcarrier(s), time(s), power level(s), and so forth to be employed by an access terminal for reverse link communication. Moreover, system 1100 may include a logical module for transmitting detailed scheduling information via an in-band channel based upon the assignment 1106. For example, the detailed scheduling information may be included with disparate data as header(s) and such detailed scheduling information may enable dynamically adjusting the assigned resources associated with the reverse link.

Figure 12:
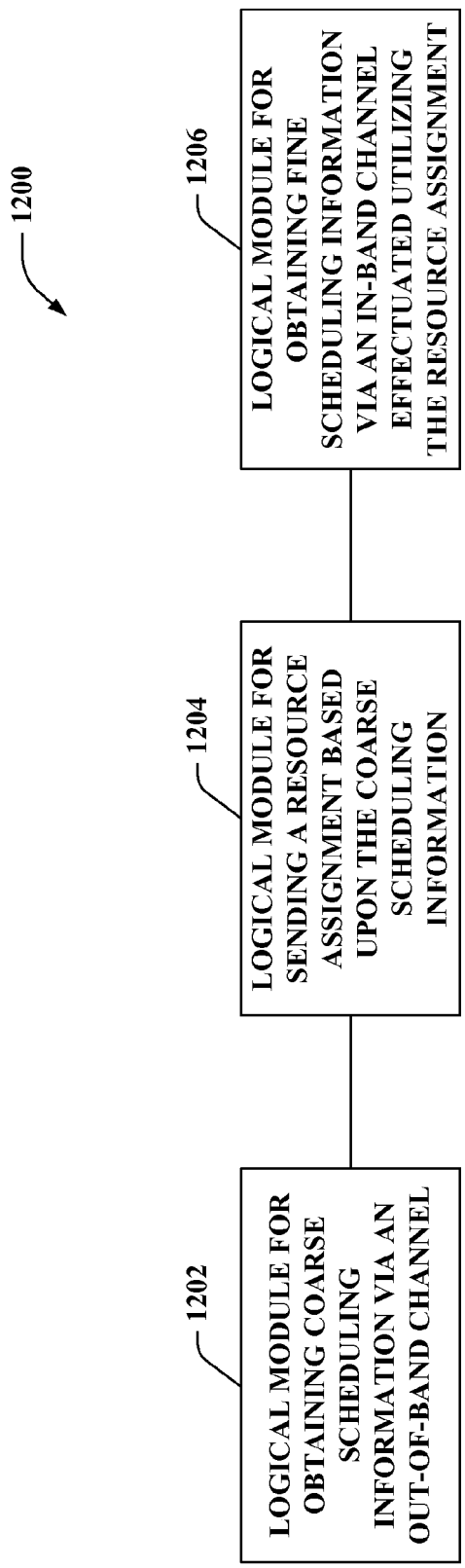
FIG. 12 is an illustration of a system that facilitates efficiently receiving scheduling information to enable allocating in-band resources

Now referring to FIG. 12, illustrated is a system 1200 that facilitates efficiently receiving scheduling information to enable allocating in-band resources. System 1200 is represented as including functional blocks, which may represent functions implemented by a processor, software, or combination thereof (e.g., firmware). System 1200 may be implemented in a base station and may include a logical module for obtaining coarse scheduling information via an out-of-band channel 1202. System 1200 may also include a logical module for sending a resource assignment based upon the coarse scheduling information 1204. Further, system 1200 may comprise a logical module for obtaining fine scheduling information via an in-band channel effectuated utilizing the resource assignment 1206.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates efficiently providing scheduling information to a central scheduler, comprising:
   transmitting coarse scheduling information via an out-of-band channel to a base station;
   obtaining an assignment for reverse link communication associated with the coarse scheduling information;
   appending detailed scheduling information to data to be transmitted over an in-band channel in accordance with the assignment; and
   transmitting the detailed scheduling information via the in-band channel to the base station based upon the assignment.

2. The method of claim 1, wherein transmitting the detailed scheduling information via the in-band channel further comprises transmitting the detailed scheduling information in accordance with the assignment.

3. The method of claim 1, further comprising transmitting the detailed scheduling information to dynamically adjust the assignment.

4. The method of claim 1, wherein the assignment allocates resources associated with reverse link communication.

5. The method of claim 4, wherein the resources include one or more subcarriers.

6. The method of claim 4, wherein the resources include one or more timeslots.

7. The method of claim 4, wherein the resources include one or more packet formats.

8. The method of claim 1, further comprising transmitting the detailed scheduling information with a scheduled data transmission.

9. The method of claim 1, wherein the coarse scheduling information is transmitted automatically when a triggering condition is met.

10. The method of claim 1, wherein the coarse scheduling information is transmitted periodically.

11. The method of claim 1, wherein transmitting the coarse scheduling information is transmitted in response to data arrival.

12. The method of claim 1, wherein the coarse scheduling information includes data related to at least one of a buffer level and a quality of service (QoS) level at an access terminal.

13. The method of claim 1, wherein the detailed scheduling information includes data related to a buffer level of each quality of service (QoS) flow at an access terminal.

14. The method of claim 1, wherein at least one of the coarse scheduling and the detailed scheduling is in the form of a range indicating a number of bits that an access terminal has to transmit.

15. A wireless communications apparatus, comprising:
a memory that retains data associated with scheduling information; and
a processor for:
transmitting, from a user equipment, coarse scheduling information via an out-of-band channel to a base station;
obtaining an assignment for reverse link communication associated with the coarse scheduling information;
appending detailed scheduling information to data to be transmitted over an in-band channel in accordance with the assignment; and
transmitting the detailed scheduling information via the in-band channel to the base station based upon the assignment.

16. The wireless communications apparatus of claim 15, wherein the assignment allocates resources associated with reverse link communication, the resources being associated with at least one of one or more subcarriers, one or more timeslots, and one or more packet formats.

17. The wireless communications apparatus of claim 15, wherein the processor transmits the detailed scheduling information with a scheduled data transmission.

18. A wireless communications apparatus for efficiently transferring scheduling information to a centralized scheduler to facilitate allocating in-band resources, comprising:
means for transmitting coarse scheduling information via an out-of-band channel;
means for obtaining an assignment for reverse link communication associated with the coarse scheduling information;
means for appending detailed scheduling information to data to be transmitted over an in-band channel in accordance with the assignment; and
means for transmitting the detailed scheduling information via the in-band channel based upon the assignment.

19. The wireless communications apparatus of claim 18, further comprising means for determining a maximum number of supportable subcarriers related to an access terminal.

20. The wireless communications apparatus of claim 18, further comprising means for dynamically adjusting the assignment based upon the detailed scheduling information.

21. The wireless communications apparatus of claim 18, further comprising means for at least one of automatically and periodically transmitting the coarse scheduling information.

22. A non-transitory machine-readable medium having stored thereon machine-executable instructions for:
transmitting coarse scheduling information by way of an out-of-band channel to a base station;
obtaining an assignment for reverse link communication associated with the coarse scheduling information;
appending detailed scheduling information to data to be transmitted over an in-band channel in accordance with the assignment; and
transmitting the detailed scheduling information by way of the in-band channel to the base station based upon the assignment.

23. The machine-readable medium of claim 22, wherein the machine-executable instructions further comprise transmitting the detailed scheduling information with a scheduled data transmission.

24. The machine-readable medium of claim 22, wherein the machine-executable instructions further comprise transmitting the coarse scheduling information at least one of automatically, in response to a triggering condition, and periodically.

25. A method that facilitates efficiently obtaining scheduling information, comprising:
receiving an out-of-band transmission including coarse scheduling information;
transmitting a resource assignment based upon the coarse scheduling information; and
receiving an in-band transmission provided based upon the resource assignment, the in-band transmission comprising detailed scheduling information appended to data.

26. The method of claim 25, further comprising dynamically adjusting the resource assignment based upon the received detailed scheduling information.

27. The method of claim 25, further comprising receiving detailed scheduling information that includes data related to at least one of a buffer size of an access terminal, a queue-latency measure for quality of service (QoS) purposes, buffer sizes for multiple QoS, and a head of line packet latency at the access terminal.

28. A wireless communications apparatus, comprising:
a memory that retains data related to allocating resources associated with reverse link communication; and
a processor that:
enables obtaining coarse scheduling information received via an out-of-band channel;
assigns resources based upon the coarse scheduling information;
receives detailed scheduling information appended to data transmitted via an in-band channel, the data transmission based upon the assigned resources; and
dynamically adjusts the in-band channel assigned resources based upon the detailed scheduling information.

29. The wireless communications apparatus of claim 28, wherein the processor analyzes the detailed scheduling information to identify a format for disparate data packets to be obtained from an access terminal.

30. A wireless communications apparatus for efficiently receiving scheduling information to enable allocating in-band resources, comprising:
means for obtaining coarse scheduling information via an out-of-band channel;
means for sending a resource assignment based upon the coarse scheduling information; and
means for obtaining detailed scheduling information appended to data transmitted via an in-band channel effectuated utilizing the resource assignment.

31. The wireless communications apparatus of claim 30, further comprising means for dynamically altering the resource assignment based upon the detailed scheduling information.

32. The wireless communications apparatus of claim 30, further comprising means for obtaining the coarse scheduling information that includes data related to a buffer level and a quality of service (QoS) level.

33. A non-transitory machine-readable storage medium having stored thereon machine-executable instructions for:
receiving an out-of-band transmission including coarse scheduling information;

transmitting a resource assignment based upon the coarse scheduling information; and receiving an in-band transmission provided based upon the resource assignment including detailed scheduling information appended to data.

34. The machine-readable medium of claim 33, wherein the machine-executable instructions further comprise dynamically adjusting the resource assignment based upon the detailed scheduling information.

35. The machine-readable medium of claim 33, wherein the machine-executable instructions further comprise receiving coarse scheduling information that includes data related to a buffer level and a quality of service (QoS) level.

36. The machine-readable medium of claim 33, wherein the machine-executable instructions further comprise receiving detailed scheduling information that includes data related to at least one of a buffer size of an access terminal, a queue-latency measure for quality of service (QoS) purposes, and buffer sizes for multiple QoS, and a head of line packet latency at the access terminal.

37. The machine-readable medium of claim 33, wherein the machine-executable instructions further comprise transmitting a signal that facilitates obtaining the coarse scheduling information.

38. A processor that executes the following instructions:
receiving coarse scheduling information by way of an out-of-band channel;
transmitting a resource assignment based upon the coarse scheduling information; and
receiving detailed scheduling information by way of an in-band channel, the detailed scheduling information appended to data provided based upon the resource assignment.

39. A method that facilitates efficiently providing scheduling information to a central scheduler, comprising:
transmitting coarse scheduling information via an out-of-band channel;
obtaining an assignment corresponding to the coarse scheduling information;
appending detailed scheduling information as one or more headers associated with a data packet to be transmitted over an in-band channel in accordance with the assignment; and
transmitting the detailed scheduling information via the in-band channel to the base station based upon the assignment.

40. A wireless communications apparatus, comprising:
a memory that retains data associated with scheduling information; and
a processor for:
transmitting coarse scheduling information via an out-of-band channel to a base station;
obtaining an assignment for reverse link communication associated with the coarse scheduling information;
appending detailed scheduling information as one or more headers associated with a data packet to be transmitted over an in-band channel in accordance with the assignment; and
transmitting the detailed scheduling information via the in-band channel based upon the assignment.

41. A wireless communications apparatus for efficiently transferring scheduling information to a centralized scheduler to facilitate allocating in-band resources, comprising:
means for transmitting coarse scheduling information via an out-of-band channel;
means for obtaining an assignment for reverse link communication associated with the coarse scheduling information;
means for appending detailed scheduling information as one or more headers associated with a data packet to be transmitted over an in-band channel in accordance with the assignment; and
means for transmitting the detailed scheduling information via the in-band channel based upon the assignment.

42. A non-transitory machine-readable medium having stored thereon machine-executable instructions for:
transmitting coarse scheduling information via an out-of-band channel;
obtaining an assignment for reverse link communication associated with the coarse scheduling information;
appending detailed scheduling information as one or more headers associated with a data packet to be transmitted over an in-band channel in accordance with the assignment; and
transmitting the detailed scheduling information via the in-band channel based upon the assignment.

43. A method that facilitates efficiently obtaining scheduling information, comprising:
receiving an out-of-band transmission including coarse scheduling information;
transmitting a resource assignment based upon the coarse scheduling information; and
receiving an in-band transmission provided based upon the resource assignment, the in-band transmission comprising detailed scheduling information included as one or more headers associated with one or more data packets communicated over a reverse link.

44. A wireless communications apparatus, comprising:
a memory that retains data related to assigning resources associated with reverse link communication; and
a processor that:
enables obtaining coarse scheduling information received via an out-of-band channel;
assigns resources based upon the coarse scheduling information;
receives an in-band transmission provided based upon the assigned resources, the in-band transmission comprising detailed scheduling included as one or more headers associated with one or more data packets communicated over a reverse link; and
dynamically adjusts the assigned resources based upon the detailed scheduling information.

45. A wireless communications apparatus for efficiently receiving scheduling information to enable allocating in-band resources, comprising:
means for obtaining coarse scheduling information via an out-of-band channel;
means for sending a resource assignment based upon the coarse scheduling information; and
means for obtaining detailed scheduling information included as one or more headers associated with one or more data packets communicated over a reverse link via an in-band channel effectuated utilizing the resource assignment.

46. A non-transitory machine-readable storage medium having stored thereon machine-executable instructions for:
receiving an out-of-band transmission including coarse scheduling information;
transmitting a resource assignment based upon the coarse scheduling information; and
receiving an in-band transmission provided based upon the resource assignment including detailed scheduling information included as one or more headers associated with one or more data packets communicated over a reverse link.

47. A processor that executes the following instructions:

receiving coarse scheduling information via an out-of-band channel;

transmitting a resource assignment based upon the coarse scheduling information; and receiving detailed scheduling information via an in-band channel, the detailed scheduling information included as one or more headers associated with one or more data packets communicated over a reverse link and provided based upon the resource assignment.

* * * * *